United States Patent [19]

Feltzin et al.

[11] 3,764,546

[45] Oct. 9, 1973

[54] ALKOXYLATED DIHALOBUTENEDIOL CONTAINING COMPOSITIONS

[75] Inventors: Joseph Feltzin; Erich Kuehn, both of Wilmington, Del.

[73] Assignee: ICI America Inc., Wilmington, Del.

[22] Filed: Mar. 10, 1971

[21] Appl. No.: 123,074

[52] U.S. Cl....... 252/182, 260/2.5 AJ, 260/2.5 AM, 260/2.5 FP, 260/77.5 AM, 260/633
[51] Int. Cl.......................... C08f 21/00, C08f 29/14
[58] Field of Search................ 252/182; 260/2.5 AJ, 260/2.5 AM, 2.5 FP, 77.5 AM, 633

[56] References Cited
UNITED STATES PATENTS

| | | | |
|---|---|---|---|
| 3,723,392 | 3/1973 | Konig et al. | 260/77.5 AM |
| 3,391,200 | 7/1968 | Dowbenko | 260/633 |
| 3,379,778 | 4/1968 | Dowbenko | 260/633 |
| 3,409,679 | 11/1968 | Niu et al. | 260/633 |
| 3,507,933 | 4/1970 | Larsen et al. | 260/633 |

FOREIGN PATENTS OR APPLICATIONS

| | | |
|---|---|---|
| 1,132,034 | 10/1968 | Great Britain ..................... 260/633 |
| 1,037,392 | 7/1966 | Great Britain |

*Primary Examiner*—Mayer Weinblatt
*Assistant Examiner*—Irwin Gluck
*Attorney*—Kenneth E. Mulford and Roger R. Horton

[57] ABSTRACT

Polyol compositions are disclosed which comprise a mixture of alkoxylated dihalobutenediol and a second polyhydroxy compound wherein the hydroxyl number of said polyol composition is from about 200 to 700. A process for preparing the polyol composition and flame-retardant polyurethane foams prepared from said polyol compositions are also disclosed.

5 Claims, No Drawings

ALKOXYLATED DIHALOBUTENEDIOL CONTAINING COMPOSITIONS

This invention relates to novel polyol compositions, to processes for preparing polyol compositions, and to flame-retardant polyurethane foam compositions prepared from polyol compositions. More particularly, this invention relates to polyol compositions containing alkoxylated dihalobutenediol, to a process for preparing said polyol composition which may comprise blending alkoxylated dihalobutenediol and a second polyhydroxy compound, and to flame-retardant polyurethane foams derived from polyol compositions containing alkoxylated dihalobutenediol.

Polyurethane foams, for reasons of economy and ease of handling, have become widely used as insulating materials in the construction and manufacturing arts. Notwithstanding that polyurethane and similarly constituted foams are excellent insulating materials by reason of their characteristic property of a low specific heat, this property itself frequently causes such foams to build up heat excessively within the surface layers thereof, which may result in the ignition of the foams. In the past, efforts have been made to overcome the disadvantages arising from the use of polyurethane and similar foams in the construction and other industries by adding to such foams a variety of additives, such as phosphorus and halogen-containing compounds, which tend to inhibit the flammability thereof. Frequently, however, the use of additives of the afore-mentioned kind results in difficulties in the preparation of the flame-retardant polyurethane foams arising from compatability problems with the reactant materials. Therefore, polyurethane foams prepared from reactant materials which would impart the characteristic of flame-retardancy thereto without the inclusion of possible incompatible additives represents a desirable advance in the art. In a companion case entitled Dihalobutene Diol Containing Compositions, filed of even date herewith, by Gaetano F. D'Alelio and Erich Kuehn, a polyol composition containing a dihalobutenediol is disclosed. Though this blend meets the criteria of stability and compatability desired for urethane foams, precipitation of the dihalobutene-diol occurs at times. It has been discovered in accordance with the present invention that precipitation of dihalobutenediol from blends of dihalobutenediol and polyol may be avoided by reacting the dihalobutenediol with an alkylene oxide.

It is accordingly an object to prepare exceptionally stable dihalobutenediol-polyol blends.

It is another object of this invention to provide a novel fire-retardant polyurethane foam.

It is another object of this invention to provide a novel polyol composition for use in the preparation of flame-retardant polyurethane foam compositions.

It is another object of this invention to provide novel processes for the preparation of said polyol blends. Still other objects of this invention will become evident to those skilled in the art from the following detailed description of the invention.

Broadly, the polyol compositions of this invention are mixtures of alkoxylated 2,3-dihalo-2-butene-1,4-diol and at least one polyhydroxy compound, wherein the hydroxyl number of said mixture is from about 200 to about 700 and wherein the amount of said alkoxylated dihalobutenediol present in the mixture is sufficient to furnish from about 10 to about 60 weight percent of dihalobutenediol moiety, based on the total weight of the mixture. Preferably the hydroxyl number of the polyol blend is from 300 to 600.

A preferred class of polyol compositions of this invention comprises a mixture of an alkoxylated dihalobutenediol containing an average of from 1 to 4 oxyalkylene groups per dihalobutenediol moiety and an organic polyhydroxy compound, wherein the hydroxyl number of said mixture is from 300 to 600 and wherein the amount of said alkoxylated dihalobutenediol present in the mixture is sufficient to furnish from about 15 to about 50 weight percent of dihalobutenediol moiety based on the total weight of the mixture.

Among the dihalobutenediols used in accordance with this invention are dibromo-, dichloro- and diiodo-butenediol. The preferred halogenated diol being dibromobutenediol.

The alkylene oxides which may be used to prepare the alkoxylated dihalobutenediols may be any alkylene oxide which will react with dihalobutenediol without excessive degradation such as propylene oxide, ethylene oxide and butylene oxide. A preferred class is polyoxypropylene dihalobutenediol with the preferred species being polyoxypropylene dibromobutenediol.

The types of polyhydroxy compounds which can be used in conjunction with the dibromobutenediol to prepare polyol blends within the polyol blends of this invention include polyhydroxy alkanes, alkoxylated polyhydroxy alkanes, sugars, alkoxylated sugars, hydroxyl terminated polyesters, hydroxyl terminated aromatic polyethers, and methylolated or alkoxylated amines.

More particularly, within the class of polyhydroxy alkanes are included sugar alcohols, and glycols. Specific examples include ethylene glycol, propylene glycol, butane diol, sorbitol, glycerine, erythritol, threitol, and 1,2,5,6-hexanetetrol. A particular mixture of polyhydroxy alkanes which may be used in preparing the fire-retardant polyol compositions of this invention are obtained by distillation fractionation of a hydrogenolysis reaction product as described in U. S. Pat. No. 3,278,398. In said patent the preferred polyol mixture is a particular fraction labeled "second subfraction" on the schematic flow sheet, and it is also identified as bottoms fraction of a distillation column called the tetrol column. This fraction will be generally called "a-polyol" for the purpose of this disclosure. "a-polyol" contains only those polyhydroxy compounds which boil at or above the boiling point of glycerin. A preferred "a-polyol" is prepared from sucrose and is called sucrose "a-polyol".

The alkoxylated polyhydroxy alkanes include the reaction products of an alkylene oxide or arylene oxide with a polyol within the above described class. The oxide which can be used in preparing the alkylene oxide derivatives can be any which will be reactive with the polyhydric alcohol without excessive degradation occuring. Among the oxides within this class are ethylene oxide, propylene oxide, butene oxide, and styrene oxide. Examples of alkoxylated polyhydroxy alkanes include polyethylene glycol, polyoxyethylene(20)sorbitol, polyoxystyrene(7)glycerol, polyoxybutylene(10) 1,2,3-butanetriol, and polyoxyethylene(1000).

Among the sugars which can be incorporated as a compound of the polyol blend of this invention are, mono and disaccharides such as sucrose, glucose, fructose, maltose and polyglucose. The alkoxylated sugars include alkylene oxide derivatives of mono and disaccharides such as polyoxystyrene(20) sucrose, polyoxybutylene(10) glucose, polyoxyethylene(4) fructose and polyoxypropylene(30) maltose.

The aromatic polyethers which may be used as part of the polyol blend of the instant invention include those polyethers where the ether link is directly to the aromatic ring such as polyphenoxy ethers and the reaction of phenols and an alkylene oxide. Exemplary of these are poly(2,6-dimethylphenyl) ether and polyoxyethylene(10) 2,2-bis(4-hydroxyphenyl) propane.

The hydroxyl terminated polyesters which can be used are those hydroxyl terminated polyesters which will be liquid at room temperature and may include the reaction products of saturated and unsaturated diacids with polyhydroxy compounds. Examples of the acids would include succinic, adipic, fumaric, maleic, and 2,2-bis(4-carboxyphenyl) propylene. The polyhydroxy materials will include polyols such as butane diol, 2,2-bis(2,6-dibromo-4-hydroxyphenyl) propane, glycerine, sorbitol, and alkoxylated derivatives of such polyhydric materials.

Amines which can be used as hydroxyl bearing compounds are alkoxylated aliphatic and aryl amines. More particularly, methylolated and alkoxylated amines which can be used in preparing the polyol blends of this invention include methylolated guanamines, methylolated melamine, alkoxylated melamines and guanamines, and methylolated and alkoxylated diamines and monoamines which contain at least one primary amino group. Examples of these amines include polyoxyethylene(7)-2,4-diamino-6-phenyl-s-triazine (more commonly called polyoxyethylene(7) benzoguanamine); 2,4,6-tris[bis(hydroxymethyl)-amino]-s-triazine; N,N-bis(hydroxymethyl), N'-methyl, tetramethylene diamine; N,N,N',N'-tetrakis(hydroxymethyl)pentamethylene diamine and N,N bis(hydroxymethyl) N'-ethyl, N'-propyl, tetramethylene diamine.

The polyol blend of this invention may be prepared in various ways. One such way would be to prepare a dihalobutenediol such as dibromobutenediol, select the polyhydroxy compound within the class of polyhydroxy compounds of this invention, mix these two components and then alkoxylate this mixture to achieve a final hydroxyl number of between 200 and 700. However, the polyol composition of this invention can also be prepared by dissolving the DBBD in a suitable solvent, such as dioxane, and alkoxylating the DBBD to an oxide content within the afore-mentioned range. The alkoxylated DBBD is then blended with one or more of said polyhydroxy compounds to yield a polyol composition with a hydroxyl number of from 200 to 700.

In a preferred process for preparing the composition of this invention the following method would be used: butyne-(2)-diol-(1,4) and an amine free polyhydroxy compound, in a ratio so that at least 3 ½ weight percent of the mixture is butynediol, is halogenated at a temperature of less than 100°C. so that substantially all the butynediol is converted to 2,3-dihalo-2-butene-1,4-diol. This reaction mixture is then contacted with an alkylene oxide in sufficient amounts to bring the final hydroxyl number below 700. To achieve the desired hydroxyl number, the ratio of alkylene oxide to hydroxyl groups may be from 0.5 through 2.0. The temperature of alkylene oxide addition is usually less than about 100°C. In the two afore-mentioned reaction steps the temperature of the reaction is maintained below or at 100°C. not because of the lack of the reaction potential at temperatures above 100°C. but rather at temperatures exceeding 100°C. the possibility of undesirable side reactions and thus side products are increased to an extent which may result in an unsatisfactory product. More particularly, the molar ratio of halogen to butynediol during the course of the halogen addition may vary from about 0.9 to 1.2 and the temperature of the reaction may be maintained at from about −5° to about 25°C. The final reaction product may contain small amounts of unreacted dihalobutenediol. If the product does contain an unreacted dihalobutenediol, it is present in amounts which are soluble in the reaction product.

The polyol blend prepared according to the above preferred process will be a stable blend of the alkoxylated dihalobutenediol, the particular polyhydroxy compounds which are the components of the subject composition. Naturally, mixtures of more than one polyhydroxy compound can be used in preparing the blends of this invention.

The following are representative examples of polyol blends which are within the scope of this invention and the process for preparing such blends:

EXAMPLE 1

204 grams of an aqueous solution of sucrose "a-polyol" containing 79.2 weight percent solids and 248 grams of 2,3-dibromo-2-butene-1,4-diol are blended together to form an intimate mixture of the two materials. 279.2 grams of this mixture are then charged to a one liter autoclave and vacuum stripped at 100°C. for a half hour. About 8.9 grams of volatiles are recovered. The temperature is then dropped at 82°C. and 2.9 grams of boron trifluoride ether complex are added. The vacuum is then broken by the addition of propylene oxide. A total of 204 grams of propylene oxide is charged to the autoclave over a 36 minute period. The mixture is kept at temperature for an additional hour to insure complete reaction of the epoxide, cooled and then removed. The autoclave is washed out with 204 grams of methanol and the resulting washings combined with the previously removed product. The methanol is then distilled at atmospheric pressure and the final traces vacuum stripped at 100°C. and one millimeter pressure until a constant weight is obtained. The product, which is 452 grams of polyoxypropylene addition product is filtered through a PYREX funnel and found to have a hydroxyl number of 402 and to be 22.1% bromine.

EXAMPLE 2

248 grams of dibromobutenediol and 204 grams of a 79.2 weight percent solids aqueous solution of sucrose "a-polyol" are intimately blended to form a stable viscous solution. 325.5 grams of this mixture are then charged to a 1 liter autoclave and vacuum stripped for a half hour at 100°C. 12.8 grams of volatiles are removed by this process. The charge is cooled to 80°C. and 2.9 grams of boron trifluoride ether complex is introduced. The vacuum is then broken by the addition of propylene oxide. A total of 350 grams of propylene oxide are charged over a 92 minute period. The mixture is kept at temperature for an additional 2 hours and 20 minutes, cooled and removed from the heat source. The autoclave is then emptied and the residual product is removed by washing the autoclave with 222 grams of methanol which is then combined with the previously removed product. The combination is neutralized to a pH of 6.6 with 50 percent aqueous solution hydroxide and the wash methanol is stripped off at atmospheric pressure. After atmospheric stripping the final traces of methanol are removed by vacuum stripping at one millimeter of pressure at 100°C. to a constant weight which is 628 grams. This product is then filtered through a PYREX-M filter funnel and analyzed. The analysis indicates that the product contains 17.1% bromine and has a hydroxyl number of 436. This corresponds to the addition of 1.1 mols of propylene oxide per hydroxyl group in the original mixture.

EXAMPLE 3

345.3 grams of dibromobutenediol are dissolved in 346.4 grams of dioxane. To this solution is added 25.8 grams of triethylene amine and the mixture is then heated under vacuum to 80°C. The vacuum is broken by the addition over a 3 hour period of 160.6 grams of propylene oxide. The reaction mixture is then maintained at 80°C. for a 12 hour period. The reaction mixture is then cooled and an additional 24.7 grams of triethylene amine is added. The reaction mixture is then reheated to 80°C. and the reaction continued for an additional hour. The reaction mixture is then removed from the reaction vessel and the reaction vessel is washed with 54.5 grams of dioxane. The wash material and the product are combined and filtered. After filtering the dioxane is stripped from the product at 80° to 85°C. The resulting product has a hydroxyl number of 490.

37 grams of the resultant polyoxypropylene dibromobutenediol and 59 grams of polyoxypropylene(10) sorbitol and 4 grams of ethylene glycol are blended together to form an intimate homogeneous polyhydroxy blend with a hydroxyl number of 483.

EXAMPLE 4

62 grams of polyoxypropylene(8) sorbitol, 1 gram of ethylene glycol, and 37 grams of polyoxypropylene(2) dibromobutenediol are blended together to form a homogeneous polyhydroxy composition. The hydroxyl number of this composition is 481.

Further examples of polyhydroxy blends within the scope of this invention were prepared by intimately blending the various components within the composition listed below in Examples 5, 6, 7, and 8. The order of addition in preparing the polyhydroxy blends of these examples is immaterial as long as an intimate mixture is prepared by vigorous stirring. The means of stirring may be any mechanical or equivalent device for blending viscous liquids. The polyester used in Example 8 is the reaction product of 177.9 grams of glycerin and 416.2 grams of phthalic anhydride which is ethoxylated with 288 grams of ethylene oxide.

EXAMPLE 5

| Polyol | Weight Percent |
| --- | --- |
| Polyoxyethylene(6) sorbitan | 50 |
| Polyoxypropylene(2) dibromobutenediol | 50 |

Hydroxyl number of the blend is about 425.

EXAMPLE 6

| | |
| --- | --- |
| Polyoxypropylene diethylene triamine | 45 |
| Ethylene glycol | 5 |
| Polyoxypropylene(2) dibromobutenediol | 50 |

Hydroxyl number of the blend is about 449.

EXAMPLE 7

| Polyol | Weight Percent |
| --- | --- |
| Sucrose Polyether | 30 |
| Ethylene glycol | 5 |
| Polyoxypropylene(10) glycerine | 15 |
| Polyoxypropylene(2) dibromobutenediol | 50 |

Hydroxyl number of the blend is about 426.

EXAMPLE 8

| | |
| --- | --- |
| Polyester | 50 |
| Polyoxypropylene(2) dibromobutenediol | 50 |

Hydroxyl number of this blend is about 305.

In general, the foams of this invention are prepared by reacting in the presence of a suitable catalyst a polyol blend in accordance with this invention and a multifunctional isocyanate in a ratio suitable to provide from about 0.8 to 1 to 1.3 to 1 isocyanate groups per hydroxyl group. A preferred range is from about 0.95 to 1 to about 1.05 to 1 isocyanate groups per hydroxyl groups.

The isocyanate used in making these novel foams can be chosen from a wide variety of compounds among which are included: diphenyl diisocyanate; toluene diisocyanate; chloro-phenyl-2,4-diisocyanate; 1,4-tetramethylene diisocyanate; p-phenylene-diisocyanate; 3,3-dimethyl-4,4'-phenylene diisocyanate; 3,3'-dimethoxy-4,4'-biphenylene diisocyanate; polymethylene polyphenyl polyisocyanate (PAPI); methylene bis (4,4'-phenylpolyisocyanate) (MONDUR MR); and other polymethylene polyphenyl isocyanates containing from about 2.2 through 3.3 NCO groups per molecule.

Catalysts which may be used in the preparation of the foams of this invention may include amino and tin catalysts or mixtures thereof. Among the suitable amine catalysts are N-alkyl morpholines such as N-methyl morpholine and N-ethyl morpholine, tertiary amines such as trimethyl amine, triethyl amine, tetramethyl guanidine, triethylenediamine, N,N,N',N'-tetramethyl-1,3-butanediamine; dimethyl ethanolamine, piperazine and piperazine derivatives, such as N-methyl piperazine, and 1,4-diazabicyclo (2.2)octane. Amine catalysts may be present in amounts from about 0.05 to about 2.0 weight percent of the reaction mixture. Among suitable tin catalysts are dialkyl tin laurates (such as dibutyl tin dilaurate), dibutyl tin di[2-ethyl hexoate], dibutyl tin diacetate, stannous oleate, and stannous octoate. Tin catalysts may be present in amounts from about 0.01 to about 1.0 weight percent of the reaction mixture.

In a preferred embodiment of preparing these foams a surface active agent and a foaming agent will be used. Examples of useful surface active agents, which can be present in amounts of from about 0.05 to about 2.0 percent by weight of the hydroxy-bearing compounds, used to prepare the polyurethane foams of this invention are water-soluble siloxane-oxyalkylene block copolymers as described in U. S. Pat. No. 2,834,748 to Bailey et al., issued May 13, 1958. A typical organosilicon surfactant is L5310 of Union Carbide Co. Other surfactants which may be used are condensates of ethylene oxide with a hydrophobic base formed by condensing propylene oxide with propylene glycol. These surfactants have a molecular weight within the range of about 2000 to about 8000 and are generally ascribed the formula $HO(C_2H_4O)_a(C_3H_6O)_n(C_2H_4O)_cH$. Another class of surfactants comprises alkylene oxide adducts of ethylene diamine having generally the formula:

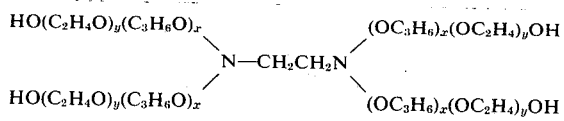

Still another class of surfactants comprise the polyoxyalkylene esters of long chain fatty acids and sorbitan such as polyoxyethylene(20)sorbitan monolaurate, polyoxyethylene((4)sorbitan monolaurate, polyoxyethylene(20)sorbitan tristearate, polyoxyethylene(5)sorbitan monooleate and polyoxyethylene(20)sorbitan trioleate.

The foaming agents which can be used for preparing the foams of this invention include water, however, a halogenated saturated aliphatic hydrocarbon or a mixture of such halogenated saturated aliphatic hydrocarbons is preferred, for example, trichlorofluoromethane (Freon 11); monochloroethane; monochloromonofluoroethane; 1,2-dibromo, 1,1,2,2-tetrafluoroethane; 1,1,2-trichloro 1,2,2-trifluoroethane; 1,1,2,2-tetrafluoro 1,2-dichloroethane; 1,2-difluoro-1,1,2,2-tetrachloroethane; dichloromethane; dibromomethane and their mixtures. Such materials may be present in nearly trace amounts up to about 50 percent by weight of the hydroxyl-bearing compound, as desired.

Preferably, though not necessarily, the foams of the present invention may be prepared by reacting the polyol composition with an isocyanate of the types hereinbefore described in the presence of at least one amine catalyst, a surfactant and a blowing agent. This will produce a self-extinguishing polyurethane foam meeting the fire-retardant requirement of ASTM-D-1692-59T.

The conditions at which the urethane foam is prepared are not critical. Temperatures as low as −40°C. may be used if proper catalyst concentration is used and if the mixture does not become too viscous. The upper temperature is limited only by the volatility of the reactants. A practical temperature range is from about 0° to about 60°C. The process can be carried out by both continuous and batch processing techniques.

To better enable those skilled in the art to practice the invention contained herein the following is a representative example of preparing a flame-retardant polyurethane foam within this invention:

EXAMPLE 9

Formulation

| ComponentA | Percent by Weight |
| --- | --- |
| Methylene bis 4,4'-phenyl polyisocyanate (MONDUR MR) | 45.6 |
| Component B | |
| Polyol Blend of Example 1 | 37.6 |
| Organo silicon surfactant (Dow Corning DC-195) | 0.6 |
| Dimethyl ethanol amine | 1.0 |
| Triethylene Diamine (33% in dipropylene glycol) | 0.2 |
| Freon R-11-B | 15.0 |

Component B of the above formulation is prepared by mixing together each of the ingredients sequentially in the amount specified and then blending the resulting mixture in a suitable container with a high speed mixer. To Component B is then added the specified amount of Component A, which is the isocyanate. The mixture of the components is stirred for 10 seconds at high speed on a high speed mixer, after which it is poured into a one gallon paper cup. Within 21 seconds the foaming action has visibly commenced (cream time), within 72 seconds the top portion of the foam is set and non-sticky (tack time), and within 110 seconds the foaming is complete as noted by the foam no longer rising (foam time). This foam is then tested by ASTM method D-1692-59T with the following results:

| Seconds | Inches |
| --- | --- |
| 25 | 2.0 |
| 24 | 2.0 |
| 25 | 1.4 |
| 31 | 2.0 |
| 26 | 1.4 |
| 27 | 1.4 |

The foregoing results indicate that the foam formulation is a flame-retardant foam.

The following are representative examples of foam formulations which may be produced by following the general procedure of Example 9. The order of mixing the ingredients of Component B is immaterial.

EXAMPLE 10

| Component A | Percent by Weight |
| --- | --- |
| Methylene bis 4,4-phenylpolyisocyanate (MONDUR MR) | 45.6 |
| Component B | Percent by Weight |
| Polyol Blend of Example 2 | 37.6 |
| Organo Silicon Surfactant (Dow Corning DC-195) | 0.6 |
| Dimethyl Ethanol Amine | 1.0 |
| Dibutyl Tin Dilaurate | 0.2 |
| Freon R-11-B | 15.0 |

ASTM D-1692-59T Test:

| Time (seconds) | 2 | 25 | 23 | 23 | 22 | 25 | 26 |
| --- | --- | --- | --- | --- | --- | --- | --- |
| Inches | 14 | 0.9 | 1.1 | 1.0 | 0.9 | 1.6 | |

EXAMPLE 11

| Component A | |
| --- | --- |
| MONDUR MR | 45.4 |
| Component B | |
| Polyol blend of Example 3 | 37.8 |
| Organo Silicon Surfactant (Dow-Corning DC-195) | 0.6 |
| Dimethyl Ethanol Amine | 1.0 |
| Triethylene Diamine (33% in dipropylene glycol) | 0.2 |
| Freon R-11-B | 15.0 |

ASTM D-1692-59T Test:

| Time (seconds) | 24 | 18 | 25 | 29 |
| --- | --- | --- | --- | --- |
| Inches | 1.50 | 2.10 | 2.55 | 2.25 |

EXAMPLE 12

| Component A | |
| --- | --- |
| MONDUR MR | 45.4 |
| Component B | |
| Polyol Blend of Example 4 | 37.0 |
| Organo Silicon Surfactant (Dow Corning DC-195) | 0.6 |
| Dimethyl Ethanol Amine | 1.0 |
| Component B | Percent by Weight |
| Triethylene Diamine (33% in dipropylene glycol) | 0.2 |
| Freon R-11-B | 15.0 |

ASTM D-1692-59T Test:

| Time (seconds) | 30 | 29 | 25 | 27 |
| --- | --- | --- | --- | --- |
| Inches | 2.20 | 2.20 | 2.10 | 1.90 |

EXAMPLE 13

| Component A | |
| --- | --- |
| MONDUR MR | 42.9 |
| Component B | |
| Polyol Blend of Example 5 | 40.2 |
| Organo Silicon Surfactant (Dow Corning DC-195) | 0.6 |
| Dimethyl Ethanol Amine | 1.0 |
| Triethylene Diamine (33% in dipropylene glycol) | 0.3 |
| Freon R-11-B | 15.0 |

EXAMPLE 14

Component A

| | |
|---|---|
| MONDUR MR | 44.6 |
| Component B | |
| Polyol Composition of Example 6 | 39.3 |
| Organo Silicon Surfactant (Dow Corning DC-195) | 0.6 |
| Triethylene Diamine (33% in dipropylene glycol) | 0.5 |
| Freon R-11-B | 15.0 |

EXAMPLE 15

| | |
|---|---|
| Component A | |
| MONDUR MR | 42.9 |
| Component B | Percent by Weight |
| Polyol Composition of Example 7 | 40.2 |
| Organo Silicon Surfactant (Dow Corning DC-195) | 0.6 |
| Dimethyl Ethanol Amine | 1.0 |
| Triethylene Diamine (33% in dipropylene glycol) | 0.3 |
| Freon R-11-B | 15.0 |

It will be evident that although this invention has been described with reference to specific polyol blends, the substitution within this blend of any polyhydroxy compound which together with a DHBD will achieve a hydroxyl number within the specified range is within the scope of the invention, and such interchange and modification to form a large variety of equivalent polyol blends useful in the preparation of fire-retardant polyurethane foams is contemplated.

Having thus described my invention, I claim:

1. A stable polyol composition suitable for the preparation of polyurethane which comprises a mixture of an alkoxylated 2,3-dihalo-2-butene-1,4-diol and an organic polyhydroxy compound selected from the group consisting of polyhydroxy alkanes, alkoxylated polyhydroxy alkanes, hydroxyl terminated polyesters, sugars, alkoxylated sugars, hydroxyl terminated aromatic polyethers, and alkoxylated or methylolated amines, wherein the hydroxyl number of said mixture is from about 200 to about 700 and wherein the amount of said alkoxylated 2,3-dihalo-2-butene-1,4-diol present in the mixture is sufficient to furnish from about 10 to about 60 weight percent of 2,3-dihalo-2-butene-1,4-diol moiety, based on the total weight of the mixture.

2. A polyol composition according to claim 1 wherein the hydroxyl number of said mixture is from 300 to 600, the concentration of 2,3-dibromo-2-butene-1,4-diol moiety in the mixture is from about 15 to about 50 weight percent and the alkoxylated dihalobutenediol contains an average of from 1 to 4 oxyalkylene groups per dihalobutenediol moiety.

3. A polyol composition according to claim 1 wherein the oxyalkylene group is oxypropylene or oxyethylene.

4. A process of preparing a polyol composition which comprises mixing an amine free polyhydroxy compound selected from the group consisting of polyhydroxy alkanes, alkoxylated polyhydroxy alkanes, sugars, alkoxylated sugars, hydroxyl terminated polyesters, and hydroxyl terminated aromatic polyethers and butynediol so that at least 3.5 weight percent of the resulting mixture is butynediol; adding halogen to said mixture in a molar ratio of from about 0.9 to 1.2 mols of halogen per mol of butynediol, at a temperature of less than about 100°C.; and reacting the resulting halogenated product with from 0.5 to 2 mols of alkylene oxide per hydroxyl equivalent of halogenated product; wherein said polyhydroxy compound and the amount of alkylene oxide are so chosen that the final hydroxyl number of the resultant polyol blend is from 200 to 700.

5. A process for preparing a polyol composition in accordance with claim 4 wherein the weight percent of butynediol is chosen so that the final weight percent of dihalobutynediol moiety in the polyol blend is from 15 to 40 weight percent of the composition, wherein the hydroxyl number of the polyol composition is from 300 to 600.

* * * * *

UNITED STATES PATENT OFFICE
CERTIFICATE OF CORRECTION

Patent No. 3,764,546      Dated October 9, 1973

Inventor(s) Joseph Feltzin and Erich Kuehn

It is certified that error appears in the above-identified patent and that said Letters Patent are hereby corrected as shown below:

Column 3, Line 9, after the word "tion" and before the words "of phenols" insert the word -- product --.

Column 5, Line 3, the word "solution" should read -- sodium --.

Column 7, Lines 12-14 should read as follows:

-- thylene(20)sorbitan tristearate, polyoxyethylene(20)sorbitan monooleate, polyoxyethylene(5)-sorbitan monooleate and polyoxyethylene(20)sorbitan trioleate. --.

Signed and sealed this 9th day of July 1974.

(SEAL)
Attest:

McCOY M. GIBOSN., JR.
Attesting Officer

C. MARSHALL DANN
Commissioner of Patents